United States Patent [19]

Bijen

[11] 4,344,910

[45] * Aug. 17, 1982

[54] PROCESS FOR THE MANUFACTURE OF WATER-HARDENING MATERIAL

[75] Inventor: Jan M. J. M. Bijen, Munstergeleen, Netherlands

[73] Assignee: Stamicarbon, B.V., Geleen, Netherlands

[ * ] Notice: The portion of the term of this patent subsequent to May 12, 1998, has been disclaimed.

[21] Appl. No.: 26,221

[22] Filed: Apr. 2, 1979

[30] Foreign Application Priority Data

Apr. 1, 1978 [NL] Netherlands ..................... 7803508

[51] Int. Cl.$^3$ .............................................. B29H 9/02
[52] U.S. Cl. .................................. 264/257; 156/42; 264/258; 264/288.8; 264/289.3; 264/290.2; 264/308; 264/333; 264/DIG. 81; 428/247; 428/255; 428/288; 428/703
[58] Field of Search ............... 428/137, 255, 247, 288, 428/188, 210 HC; 264/174, 316, 228, 35, 39, 258, 257, 288.8, 289.3, 290.2, 155, 156, DIG. 81, 308, 333; 52/662, 177, 368, 659, 309.17, DIG. 7, 600, 596; 156/42

[56] References Cited

U.S. PATENT DOCUMENTS

| | | | |
|---|---|---|---|
| 838,226 | 12/1906 | Westenhuber et al. | 264/164 |
| 1,353,225 | 9/1920 | Donoghue | 264/258 |
| 2,358,758 | 9/1944 | Eames | 264/258 |
| 2,551,796 | 5/1951 | Fitzpatrick et al. | 428/137 |
| 2,669,860 | 2/1954 | Bell | 52/600 |
| 2,850,890 | 9/1958 | Rubenstein | 428/310 HC |
| 3,092,439 | 6/1963 | Harrison | 264/154 |
| 3,137,611 | 6/1964 | Krolik | 428/188 |
| 3,324,213 | 6/1967 | Anfinset | 52/DIG. 7 |
| 3,376,629 | 4/1968 | Baumann et al. | 52/309.17 |
| 3,405,027 | 10/1968 | Wyckoff | 264/290.2 |
| 3,454,455 | 7/1969 | Rasmussen | 428/137 |
| 3,597,890 | 8/1971 | Hala | 52/309.17 |
| 3,655,501 | 4/1972 | Tesch | 428/137 |
| 3,719,736 | 3/1973 | Woodruff | 264/156 |
| 3,800,492 | 4/1974 | Oroschakoff | 52/662 |
| 3,832,267 | 8/1974 | Liu | 264/290.2 |
| 3,881,489 | 5/1975 | Harewell | 428/137 |
| 3,985,599 | 10/1976 | Lepoutre et al. | 428/137 |
| 4,059,713 | 11/1977 | Mercer | 264/167 |
| 4,070,427 | 1/1978 | Romnaldi et al. | 264/174 |
| 4,133,928 | 1/1979 | Riley et al. | 428/257 |
| 4,134,243 | 1/1979 | Fries | 52/596 |
| 4,168,924 | 9/1979 | Draper et al. | 428/255 |
| 4,190,692 | 2/1980 | Larson | 428/255 |
| 4,242,407 | 12/1980 | Bijen | 428/247 |
| 4,267,136 | 5/1981 | Bijen | 428/255 |

FOREIGN PATENT DOCUMENTS

| | | | |
|---|---|---|---|
| 2517790 | 4/1976 | Fed. Rep. of Germany | 428/137 |
| 7707253 | 6/1977 | Netherlands . | |
| 1130612 | 10/1968 | United Kingdom | 264/228 |

*Primary Examiner*—Jay H. Woo
*Attorney, Agent, or Firm*—Cushman, Darby & Cushman

[57] ABSTRACT

An improved process for the manufacture of reinforced shaped articles from water-hardening materials. A plurality of continuous networks of synthetic organic polymer material having at least two meshes per square centimeter are incorporated in said water-hardening materials as reinforcement. The networks are prepared by forming meshes in an unfibrillated film of the synthetic organic polymer material.

21 Claims, No Drawings

PROCESS FOR THE MANUFACTURE OF WATER-HARDENING MATERIAL

BACKGROUND OF THE INVENTION

The invention relates to an improved process for the manufacture of sheets and other shaped articles from a water-hardening material, such as cement and gypsum, reinforced with continuous networks of synthetic organic polymers incorporated therein.

The term "water-hardening material" as used herein refers to a mixture of a dry or substantially dry binder and water, optionally containing aggregates, that can be hardened or bound into a solid rigid mass by reaction between the binder and water. The term also applies to the hardened material after setting. Suitable binders include, for example, various types of cement, gypsum and other similar material such as Portland cement, aluminum cement, plaster of Paris and anhydrite.

It has been proposed in Netherlands patent application No. 7,707,253 to prepare sheets and other articles from reinforced water-hardening masses, wherein the reinforcement consists of networks of continuous fibrillated organic film. It has been found that the incorporation of such networks results in a surprisingly significant improvement in the strength of the water-hardening material. However it appears that the strength is not equally high in all directions. Although high strengths can be achieved in the direction of fibrillation, the strength is considerably lower normal to this direction. This is possibly due to the instability of the knots or intersections of the filaments forming the network. This disadvantage can be overcome by the use of combinations of networks arranged normal to one another, but this renders the process of fabricating the final articles considerably more complicated.

BRIEF DESCRIPTION OF THE INVENTION

The object of the present invention is to provide a process that yields products of excellent strength in all directions. A further object is to provide a process for making articles from water-hardening materials having excellent strength properties at a comparatively low cost. It has now surprisingly been found that these and other objects can be achieved by the incorporation of continuous unfibrillated networks in water-hardening materials, which networks are formed from synthetic organic polymer films having at least two meshes per $cm^2$, preferably at least 3, and most preferably at least 10 meshes per $cm^2$.

As used herein, the term "continuous unfibrillated networks" refers to networks that are not fibrillated, that is, the meshes are not separated only by fibrils. Rather, the networks are formed by other means such as by removing portions of the plastic film or by pushing portions of the plastic film aside. This results in the network having a greater stability, particularly at the intersection or knots of the film portions forming the network. Such networks, as used in the invention, extend across a large dimension of the article in which the network is incorporated, that is, its length or width.

If the meshes are completely shaped and surrounded by fibrils the strength of the resulting network is not uniform. However it has been found that the continuous unfibrillated networks of this invention give at least the strength of networks formed from fully fibrillated films, and additionally offer the advantage of more uniform strength in all directions, and hence a higher and more uniform strength of the products in which they are incorporated. Furthermore, the number of meshes in such networks can be more accurately controlled, as well as the shape and size of these meshes. This is very important inasmuch as it has been found that the number of meshes has a decisive effect on the final strength properties of the manufactured articles. Furthermore, the greater mechanical strength of the continuous unfibrillated networks of this invention facilitate their handling during the manufacture of articles of reinforced water-hardening material in which they are incorporated.

DETAILED DESCRIPTION OF THE INVENTION

The networks used in this invention are made by first processing the synthetic organic polymer into a film by conventional means, such as by an extruder or by use of calenders. The sheets of film are preferably very thin, ranging in thickness from about 2 to 250 $\mu$m, particularly from about 5 to 100 $\mu$m.

The plastic material used to form the films from which the continuous unfibrillated networks are formed may be a polyolefin, such as polyethylene and polypropylene, as these polymers possess some very favorable properties rendering them particularly suitable for use as reinforcement in water-hardening materials. If polypropylene is used, a material is preferably chosen having a melt index in the range of between 1 and 15, most preferably between 2 and 9 dg/min. When polyethylene is used, the melt index preferably ranges between 0.01 and 10, particularly between 0.02 and 0.2 dg/min.

Also thermoplastic materials that form films and fibers, such as polymers of styrene or vinyl chloride, or copolymers thereof may be used. Partly crystalline polymers may be used as well. Special preference is given to modified or unmodified polyolefins. Examples of suitable modified polyolefins are chlorinated polyethylene and polypropylene. Polypropylene homopolymer has been found to be most suitable, although copolymers and block copolymers, for example with ethylene, may also be used, as well as mixtures of polymers.

The polymer utilized may also contain various types of fillers and auxillary substances such as carbon black, polar substances, pigments, light and heat stabilizers and antioxidants. It has been found very important that the correct stabilizers are incorporated in the networks, and favorable results have been achieved with a combination of a metal deactivator and an antioxidant. These compounds are used in amounts of from 0.001 to 2.5% by weight, preferably from 0.01 to 1% by weight. The preferred metal de-activators are complexing agents, some examples of which are phosphoric acid, citric acid, ethylene diamine tetra-acetic acid or a salt thereof, N,N'-disalicylidene ethylene diamine, lecithin, gluconic acid, hydrazine derivatives and oxanilide derivatives, particularly N,N'-bis (3,5-ditertbutyl-4-hydroxyphenyl) propionyl hydrazine. Preferably citric acid, whether or not free of water, is chosen as the metal de-activator.

The antioxydants are preferably non-phenolic ones, for instance amines, particularly aromatic and secondary amines, such as N,N'-disubstituted p-phenylen diamines, diphenyl amine derivatives, amino-phenol derivatives, condensation products of aldehydes and amines or of ketones and amines. Further suitable antioxidant compounds include sulfur compounds such as mercaptans, thioethers, disulphides, and dithiocarbamates, zinc dimethyl dithiocarbamate being an example. Also phosphorus compounds, such as derivative of phosphoric acid or dithiophosphoric acid, may be used. However, preference is given to the group of amines.

This invention also contemplates the use of film materials which may have been treated with, for example, radiation such as UV light and corona discharge, or oxidizing acids such as chromic acid, to obtain adhesion between the network and the water-hardened mass.

Before the meshes are made in the film, it is advantageous to stretch the film uniaxially or biaxially. This offers various advantages including a considerable increase in strength and at the same time a reduction in the thickness of the film. The meshes may be made in the film in a number of ways. It has been found, however, that optimum results are obtained when the plastic material is pushed aside, being in a plasticized state, and/or removed mechanically. Methods in which the film is notched or perforated, without removing material, have been found to give less favorable results. These latter methods produce meshes having very sharp corners such that the stability and strength of the knots or intersections are less than desired. The corners of the meshes according to the present invention are preferably over 45°, especially over 60°, and most preferably about 90°. Meshes without corners have also strong preference.

The networks used in this invention are preferably made by processing a synthetic organic thermoplastic polymer into a film, plasticizing this film by heating it at least in the places where the meshes will be formed, and then pressing the material away, followed by stretching the film after mesh formation. It is also advantageous to stretch the film, such as lengthwise, before the meshes are made. Preferably the plastic material is pressed away along the length of the film so that a thickened edge or ridge is formed, after which the film is stretched in a direction normal to its length. This has the effect of eliminating the thickened edges or ridges. The pushing aside of the plasticized material can be advantageously accomplished by means of two or more rollers, at least one of which is smooth. Another roller pressing against the first is provided with protrusions or teeth. This latter roller, also called a punch roller, preferably has a peripheral speed that is 25 to 50% lower than that of the mating smooth roller. It is also possible to use hot rollers that serve to plasticize the film, however the punch roller is preferably cooled.

If the film must be heated in order to plasticize it, its mechanical strength becomes very low so that problems may arise in handling the film. It is therefore preferable to reinforce the film in one way or another if high production speeds are to be achieved. A particularly attractive way of reinforcing the film is to apply filaments of a material that does not melt, or melts at temperatures higher than the polymeric material out of which the film is made. These filaments must be incorporated lengthwise in the film. The meshes can then be made in the film in between the continuous filaments of the material having the higher melting point by pushing the plastic material aside into a thickened edge or ridge. It is advantageous that the reinforced film has previously been stretched lengthwise.

After the meshes have been made, the film can again be stretched lengthwise. It is also desirable to stretch the film broadwise, in a direction normal to its length in order to eliminate the thickened edges or ridges. It is furthermore possible that the film would then be in a state of imminent of fibrillation. In this embodiment, good and stable networks may be obtained when the total degree of stretching is about 3 to 10 times lengthwise, and about 5 to 15 times crosswise or normal to the length.

It has been found that very suitable combinations of film material and higher melting filament material include polyethylene as the film material in which polypropylene, polyamide and/or polyester filaments have been applied, as well as polypropylene film in which polyamide and/or polyester filaments have been incorporated. Care must be taken, however, when polymers such as polyamides and/or polyesters are incorporated in the strongly alkaline water-hardening materials, inasmuch as these polymers are very susceptible to hydrolysis in such a medium. This can be done, however, only if these polyamides and/or polyester filaments are fully embedded in or fully surrounded by polyolefins.

After the meshes have been formed in the film, the film can be stretched uniaxially or biaxially. By stretching after the meshes have been found, the meshes can be enlarged and accumulated material, if any, can be smoothed out. Other advantages of biaxial stretching include the enlargement of the originally small meshes to a size of at least 100 $\mu$m, preferably at least 300 $\mu$m in diameter, which results in a further improvement in the strength properties of the article formed.

It is of particular importance that the films have a sufficiently large number of meshes to achieve the desired strength of the ultimate article in which they are incorporated. Thus the film network will have at least two meshes per cm$^2$, preferably at least three, and most preferably at least 10 meshes per cm$^2$. The number of meshes per unit volume of the finished product is also of particular importance. If this number is sufficiently high, excellent mechanical properties are achieved, particularly excellent resilience and retention of physical properties. Thus the number of meshes in films of organic synthetic polymer incorporated in the final product is preferably at least 100 per cm$^3$ of the final product. Preferably this number will exceed 200, and most preferably will be at least 300 meshes per cm$^3$. In fact best results are obtained if this mesh density or concentration is over 500 meshes per cm$^3$ of the finished product.

It is also advantageous to use networks having a large specific surface area in addition to a large number of meshes. This can be achieved by utilizing networks that are not smooth, and that have many protruding loose fibrils, so that the network has a coarse or hairy texture. The specific surface area of the network is preferably at least 1 mm$^2$/mm$^2$ and preferably at least 3 mm$^2$/mm$^2$. The specific surface area of the networks per unit volume of the end product should be at least 10 mm$^2$/mm$^3$, and most preferably at least 25 mm$^2$/mm$^3$. This large specific surface area also contributes to improvement of the multiple cracking characteristics during pseudoplastic deformation of the article, or in other words, an increase in the number of microcracks and a decrease in their size upon deformation. This phenomenon has a very favorable affect on the properties of the end product, particularly contributing to its superior ability to readily regain its former shape after deformation.

The water-hardening material in which the networks are incorporated contains a water-hardening binder, aggregates if desired, and water. The relative amounts may vary within wide limits, but the ratio between the amount of water and the amount of water-hardening binder generally ranges between about 0.2 and 10. The aggregates used, particularly sand, should preferably be so fine that the average particle size is less than 1 mm, and the amount used may be varied within wide limits. The ratio between the amount of water-hardening binder and the amount of aggregates preferably ranges between about 0.05 and 3.

Various aggregates and/or auxillary substances may be added to water-hardening material including sand, gravel, chalk, powdered quartz, plastic waste, sulfur, clay, fibers, vulcanized or unvulcanized rubber, rock wool, glass wool, hardening accelerators, pigments and processing aids. It can also be advantageous to add polyvinyl alcohol or polyvinyl acetate to the suspension of water and binder, which may have a favorable effect on the oxygen impermeability of the finished article. These latter additives furthermore serve to better protect the plastic of the network against oxygen diffusing into the article which is particularly important when polypropylene networks are used.

The water-hardening material may additionally contain auxillary substances to improve or accelerate its processing into the end products. Such auxillary substances include so-called deflocculants or other surfaces-active agents, hardening accelerators or retarders, and thickeners. These auxillary substances may also be incorporated in the film material from which they can be slowly released in a controlled manner. Furthermore, other additives such as flame-retarding and/or flame-proofing agents may be incorporated in the water-hardening material and/or the plastic film from which the network is made. For example, antimony trioxide and chlorinated and/or bromonated compounds, either together or separately, may be processed into one or both of the components.

The process of this invention can be effected either continuously or discontinuously. It should be apparent, however, that they cannot be made in the conventional manner used in the manufacture of asbestoscement products, wherein a suspension of water-hardening material and fibers are mixed to a homogeneous consistency in normal rotating mixing equipment and thereafter processed into layers and hardened. The continuous unfibrillated networks of the present invention of course prevent the utilization of such equipment. Therefore other techniques must be used to build the articles of this invention.

The discontinuous method involves placing alternate layers of water-hardening material and the continuous unfibrillated networks on top of one another until a satisfactory layer thickness has been obtained. However such a hand-building method is time consuming and costly.

Alternatively, the articles may be made in a continuous way by continuously unwinding a network contacting it with a water-hardening material and rolling it, together with the water-hardening material, onto a forming roller until the desired layer thickness has been reached. The layered material thus formed can then be put into the desired shape and hardened. It is also possible to manufacture hollow articles by winding one or more networks around a mandrel while the water-hardening material are continuously applied to the networks either by emersion or spraying.

A particularly preferable continuous method for forming the articles within the scope of this invention involves (a) forming continuous lengths of networks from unfibrillated organic films, each of which contains a plurality of meshes; (b) simultaneously advancing a plurality of such networks into contact with the water-hardening material so as to form a composite layer of such networks and the water-hardening material; and (c) shaping this composite layer into the desired configuration and allowing it to set. This method permits the formation of an article containing multiple layers in one operation without the need for a time consuming and expensive hand-building method.

Continuous lengths of unfibrillated networks may be supplied to such a process from a reel onto which they have been wound. Alternatively, the networks may be formed directly from the outflow from an extruder head in film form, in which film meshes are formed to prepare the networks, and thereafter contacting such networks with the water-hardening material to form the articles.

The contacting of networks with the water-hardening material can be accomplished by various methods. These include pouring in which a suspension of the water-hardening material is formed and poured, by means of a distributor, onto the networks as they are unwound and advanced through the process. Alternatively, the various components of the water-hardening material may be applied by spraying or sprinkling. Any excess water present can be removed for example by vacuum through a porous material, and the resulting layer of networks and water-hardening material is then compacted by vibration and/or compressing so that better coherence is obtained. The layer is thereupon shaped into the desired configuration for the ultimate shaped article and permitted to set. Alternatively, a number of such layers can be formed, continuously brought together, compacted, shaped, and allowed to set, in order to form a shaped article of greater thickness.

As used herein, the term "continuous" should be understood to include not only the use of such continuous networks formed by the direct outflow from an extruder, but also discrete lengths of such films which can be fed into the process from, for example, a reel, but which networks have a length many times longer than the length of the ultimate article. Consequentially, the networks used in the invention consist of continuous networks which extend virgually over the entire major dimensions of the shaped article.

The articles made according to the present invention may contain not only the reinforced water-hardening mass as above described, but also other materials such as foamed polymers or other foamed, expanded or light materials can be incorporated into the product formed. Examples of such materials are expanded polyethylene, polypropylene, polyvinyl chloride, polystyrene or polyurethane, and mineral materials such as perlite, rock wool or glass wool. The additional layer or layers of these materials can impart insulating properties to the products, as well as lower weight, lower price and better protection against moisture and impacts or blows. These additional layers or sheets can be supplied either continuously or intermittently or can be formed in situ, after which the reinforced water-hardening layer is applied. Alternatively, such additional layer or sheet of foam may be applied to the foamed layer of water-hardening material and networks.

If desired, a light and/or foamed or expanded material may be processed as an aggregate added into a previously prepared suspension of the water-hardening binder, water and any other aggregate or additives. It is also possible to foam the suspension containing the water-hardening binder itself.

Another application of the products of the present invention is to use them together with fillers incorporated as a separate layer in the ultimate product. An example of such a composition would be an unreinforced inner layer of gypsum or other water-hardening material surrounded by layers of water-hardening material reinforced with networks. If desired, the inner layer itself may also be provided, perhaps to a lesser extend, with a network reinforcement. It is also possible to apply separate cement layers of different composition, for example, one or more cement layers containing glass beads.

The density of networks in the final product, expressed as a % by volume of the final product, ranges between about 0.25 and 20%, but more suitably between about 2 and 15%. Preferably, however, the density of networks in the final product will range between about 3 and 10%. It should be understood that different portions of the final product may have different densities. For example, very suitable articles can be made by utilizing the above network concentration or density in the outer layers only. In such instance, the outer reinforced layer should have a thickness of at least about 1 mm and contains at least five networks.

EXAMPLE

Sheets were made of Portland cement reinforced with unfibrillated networks of polypropylene in which polyamide filaments were incorporated lengthwise. The meshes are made by pushing aside plastic material and stretching the film. The network thus obtained had 16 more or less rectangular meshes per cm$^2$ and had a specific surface area of 4 mm$^2$/mm$^2$. Seven such networks were incorporated per mm of thickness of the finished sheet, which resulted in 1120 meshes per cm$^3$ of end product. The content by volume of the network was 7%, and the specific surface area was 25 mm$^2$/mm$^3$. The networks were soaked in a suspension of Portland cement A, water and sand. The sand particles had a size of between 100 and 200 $\mu$m. The water-cement factor (WCF) was 0.75 and the amount of sand was 20% by weight relative to the cement. The layer was then pressed and cut. The WCF of the cut sheet was 0.25.

The properties of the moulded sheet were measured after 28 days' setting at a relative humidity of 95% by means of a four-point bending test. Lengthwise the bending strength was 26 N/mm$^2$ and, normal to the length, it was 17 N/mm$^2$ resulting in a ratio of 1.5. Loading gave rise to very fine multiple cracking, resulting in a very smooth bending curve.

COMPARATIVE EXAMPLE

A sheet made by using fibrillated networks according to European patent application No. 78200392.5 resulted in a ratio between lengthwise bending strength and bending strength normal to the length of 2.5.

What is claimed is:

1. An improved process for the manufacture of reinforced shaped articles from water-hardening materials, said improvement comprising incorporating in said water-hardening materials a plurality of continuous networks of synthetic organic polymer material having at least two meshes per square centimeter, said networks having been prepared by forming said meshes in an unfibrillated film of said synthetic organic polymer material in a manner so as to avoid forming meshes having sharp corners.

2. The process of claim 1 wherein said networks have at least three meshes per square centimeter.

3. The process of claim 2 wherein said networks have at least 10 meshes per square centimeter.

4. The process of claim 1 wherein said film has been stretched in at least one direction before forming said meshes therein.

5. The process of claim 4 wherein said film has a thickness of from 1 to 250 $\mu$m after being stretched.

6. The process of claim 5 wherein said film thickness ranges between 10 and 200 $\mu$m.

7. The process of claim 1 wherein said synthetic polymer material is primarily composed of at least one polyolefin.

8. The process of claim 7 wherein said at least one polyolefin is polypropylene having a melt index of from 3 to 9 dg/min.

9. The process of claim 7 wherein said at least one polyolefin is a polyethylene having a melt index of 0.01 to 10 dg/min.

10. The process of claim 1 wherein a portion said synthetic organic polymer material film is pushed aside so as to form said meshes.

11. The process of claim 1 wherein a portion of said synthetic organic plastic material film is removed by mechanical means so as to form said meshes.

12. The process of claim 1 wherein said film is stretched in at least one direction after the formation of said meshes.

13. The process of claim 1 wherein the number of meshes in said networks, and the number of networks incorporated in said water-hardening material are chosen such that the average number of meshes is at least 100 per cubic centimeter of said reinforced shaped article.

14. The process of claim 13 wherein said average number of meshes is at least 500 per cubic centimeter of said reinforced shaped article.

15. The process of claim 1 wherein said networks have been prepared from a film of a thermoplastic material by the steps of:
plasticizing at least a portion of said film material by heating;
forming a plurality of meshes in said film by pushing aside portions of said plasticized material; and
stretching, in at least one direction, said film in which said meshes have been formed.

16. The process of claim 15 wherein, as a first step, said film is stretched in at least one direction.

17. The process of claim 16 wherein said plastericized material is pushed aside along the length of the film so as to form a thickened ridge, whereafter said film is stretched in a direction normal to the length of said film.

18. The process of claims 4, 12 or 16 wherein the total degree of stretching of said film prior to and subsequent to forming said meshes therein is 3 to 10 times in a lengthwise direction, and 5 to 15 times in the direction normal to the length of said film.

19. The process of claim 1 wherein said networks have been prepared from a film having incorporated therein filaments of a material that does not melt at or below the melting temperature of the synthetic organic polymer material of said film, said filaments being disposed lengthwise relative to said film.

20. The process of claim 19 wherein the synthetic organic polymer material of said film is polyethylene, and said filaments are made of a material selected from the group consisting of polypropylene, polyamide, polyester and combinations thereof.

21. The process of claim 19 wherein the synthetic organic polymer material of said film is polypropylene, and said filaments are made from a material selected from the group consisting of polyamide, polyester and combinations thereof.

* * * * *